(12) United States Patent
Fukuda et al.

(10) Patent No.: US 9,548,683 B2
(45) Date of Patent: Jan. 17, 2017

(54) MOTOR CONTROLLER

(71) Applicant: DENSO CORPORATION, Kariya, Aichi-pref. (JP)

(72) Inventors: Takayuki Fukuda, Novi, MI (US); Tatsuhiro Matsuki, Obu (JP); Kazuaki Takemoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/781,401

(22) PCT Filed: Mar. 27, 2014

(86) PCT No.: PCT/JP2014/001779
§ 371 (c)(1),
(2) Date: Sep. 30, 2015

(87) PCT Pub. No.: WO2014/162701
PCT Pub. Date: Oct. 9, 2014

(65) Prior Publication Data
US 2016/0043669 A1    Feb. 11, 2016

(30) Foreign Application Priority Data

Apr. 3, 2013    (JP) ................................ 2013-077847

(51) Int. Cl.
*G05B 11/32*    (2006.01)
*H02P 5/68*    (2006.01)
(Continued)

(52) U.S. Cl.
CPC . *H02P 5/68* (2013.01); *B60H 1/00* (2013.01); *B60H 1/00428* (2013.01);
(Continued)

(58) Field of Classification Search
CPC ............ H02P 5/68; H02P 3/08; H02P 21/0003; H02P 27/08; B60H 1/00; B60H 1/00428; B60H 1/00857
(Continued)

(56) References Cited

U.S. PATENT DOCUMENTS 4,358,050 A  *  11/1982  Naganoma ......... B60H 1/00007
                                                      165/42
4,426,852 A  *  1/1984   Nishimura ......... B60H 1/00735
                                                      165/247
(Continued)

FOREIGN PATENT DOCUMENTS

JP    2001231295 A    8/2001
JP    2004208437 A    7/2004
(Continued)

OTHER PUBLICATIONS

International Search Report and Written Opinion (in Japanese with English Translation) for PCT/JP2014/001779, mailed Jun. 17, 2014; ISA/JP.

*Primary Examiner* — Rita Leykin
(74) *Attorney, Agent, or Firm* — Harness, Dickey & Pierce, P.L.C.

(57) ABSTRACT

When a control device of a motor controller simultaneously rotates a first DC motor and a second DC motor by controlling a first circuit, a second circuit and a third circuit, the second circuit is shared. Further, the control device controls each of switch elements of the shared second circuit by using pulse-width modulation. Accordingly, the drive of the first DC motor and the second DC motor can be controlled with high accuracy by the change of a duty ratio of each of the switch elements of the shared second circuit.

3 Claims, 5 Drawing Sheets

(51) Int. Cl.
*B60H 1/00* (2006.01)
*H02P 3/08* (2006.01)
*H02P 21/00* (2016.01)
*H02P 27/08* (2006.01)

(52) U.S. Cl.
CPC ........... *B60H 1/00857* (2013.01); *H02P 3/08* (2013.01); *H02P 21/0003* (2013.01); *H02P 27/08* (2013.01)

(58) Field of Classification Search
USPC ..... 318/562, 34, 38, 53–57, 66, 90, 86, 599; 363/26, 41
See application file for complete search history.

(56) References Cited

U.S. PATENT DOCUMENTS

| | | | | |
|---|---|---|---|---|
| 5,199,485 A | * | 4/1993 | Ito | B60H 1/00007 165/203 |
| 5,301,515 A | * | 4/1994 | Iritani | B60H 1/00392 454/121 |
| 5,390,728 A | * | 2/1995 | Ban | B60H 1/00742 165/202 |
| 5,669,231 A | * | 9/1997 | Itoh | B60H 1/00907 62/210 |
| 5,706,667 A | * | 1/1998 | Iritani | B60H 1/00828 165/244 |
| 6,949,021 B2 | * | 9/2005 | Ichishi | B60H 1/004 165/288 |
| 7,013,659 B2 | * | 3/2006 | Yoshida | B60H 1/00278 429/62 |
| 7,227,339 B2 | * | 6/2007 | Kobayashi | H02J 7/245 310/263 |
| 7,325,595 B2 | * | 2/2008 | Homan | B60H 1/004 165/202 |
| 8,047,274 B2 | * | 11/2011 | Oomura | B60H 1/004 165/202 |
| 8,350,516 B2 | * | 1/2013 | Takeuchi | B60L 3/0023 318/800 |
| 8,482,234 B2 | * | 7/2013 | Yamakawa | H02P 23/0004 318/400.3 |
| 8,688,322 B2 | * | 4/2014 | Shigyo | B60H 1/00421 454/159 |
| 9,371,024 B2 | * | 6/2016 | Ichishi | B60N 2/5628 |
| 2001/0015630 A1 | | 8/2001 | Shibazaki et al. | |
| 2004/0232864 A1 | | 11/2004 | Sunaga et al. | |
| 2004/0245954 A1 | | 12/2004 | Moench et al. | |
| 2010/0155162 A1 | | 6/2010 | Nakamura et al. | |
| 2013/0038257 A1 | | 2/2013 | Sato | |

FOREIGN PATENT DOCUMENTS

| | | | |
|---|---|---|---|
| JP | 2004345558 A | 12/2004 | |
| JP | 2006506262 A | 2/2006 | |
| JP | 2006258076 A | 9/2006 | |
| JP | 2007295661 A | 11/2007 | |
| JP | 2009033834 A | 2/2009 | |
| JP | 2010146920 A | 7/2010 | |
| JP | 2012121517 A * | 6/2012 | ............ B60H 1/00 |
| JP | 2012121517 A | 6/2012 | |
| WO | WO-2011155160 A1 | 12/2011 | |

* cited by examiner

MOTOR CONTROLLER

CROSS REFERENCE TO RELATED APPLICATIONS

This application is a U.S. National Phase Application under 35 U.S.C. 371 of International Application No. PCT/JP2014/001779 filed on Mar. 27, 2014 and published in Japanese as WO 2014/162701 A1 on Oct, 9, 2014. This application is based on and claims the benefit of priority from Japanese Patent Application No. 2013-077847 filed on Apr. 3, 2013. The entire disclosures of all of the above applications are incorporated herein by reference.

TECHNICAL FIELD

The present disclosure relates to a motor controller that controls driving of plural motors.

BACKGROUND ART

Patent Document 1 discloses a configuration in which an electric motor drive circuit for driving doors of an air conditioning apparatus is simplified.

Further, Patent Document 2 discloses a servo motor controller controlling a servo motor so that the servo motor decelerates when a deviation between a target value and a present value is not larger than a deceleration-start reference value. Specifically, when the deviation is not larger than the deceleration-start reference value, a high-side metal-oxide semiconductor (abbreviated as MOS) or a low-side MOS of an electric motor is driven using pulse-width modulation (abbreviated as PWM) with a duty ratio set according to the deviation, so that the electric motor decelerates. Accordingly, stopping accuracy is improved and noise at the time of stopping is reduced.

PRIOR ART DOCUMENT

Patent Document

Patent Document 1: JP 2012-121517 A
Patent Document 2: JP 2004-345558 A

SUMMARY OF THE INVENTION

According to the examination by the inventor of this application, a voltage supplied to the motor is reduced in a case in which a duty ratio is reduced when the deviation is not larger than the deceleration-start reference value as in Patent Document 2. In this case, since power to be supplied is not sufficient in a motor having a significant torque fluctuation and in a motor for a mode door that requires torque when being closed, the motors may stop before reaching a target.

Further, when the simplified circuit of the above-mentioned Patent Document 1 is subjected to PWM drive for deceleration in Patent Document 2 and motors making a pair are simultaneously driven, one motor stops or decelerates and the other motor also stops or decelerates likewise. Accordingly, not only one motor but also the other motor stops. Therefore, the time taken for the other motor to reach a target value is increased. Furthermore, since the number of times of stop of the other motor is increased when not only one motor but also the other motor stops, the number of times of generation of sound, which is generated at the time of stop, is increased. The sound, which is generated at the time of stop, is, for example, sound that is generated when a door or the like operated by a motor comes into contact with a housing. This sound may cause noise.

The present disclosure has been made in consideration of the above description, and an objective of the invention is to provide a motor controller which can stably operate motors by using pulse-width modulation and reduce the number of times of stop of each motor while a drive circuit driving the motors can be simplified.

According to a first aspect of the present disclosure, a motor controller controls driving of first and second motors. The motor controller includes a first half-bridge circuit that includes a pair of switch elements connected to each other in series between a positive terminal and a negative terminal of a battery, a second half-bridge circuit that includes a pair of switch elements connected to each other in series between the positive terminal and negative terminal of the battery, a third half-bridge circuit that includes a pair of switch elements connected to each other in series between the positive terminal and the negative terminal of the battery, a voltage acquisition part that acquires a voltage of the battery, and a control device that controls the pair of switch elements of each of the half-bridge circuits and controls the pair of switch elements of at least the second half-bridge circuit by using pulse-width modulation. The first motor is connected to the first half-bridge circuit and second half-bridge circuit, and the second motor is connected to the second half-bridge circuit and third half-bridge circuit. The control device applies an electric current to the first motor between the first half-bridge circuit and second half-bridge circuit by controlling the pair of switch elements of the first half-bridge circuit and the pair of switch elements of the second half-bridge circuit. The control device applies an electric current to the second motor between the second half-bridge circuit and third half-bridge circuit by controlling the pair of switch elements of the second half-bridge circuit and the pair of switch elements of the third half-bridge circuit. The control device changes a duty ratio of the control, which uses the pulse-width modulation, according to the voltage that is acquired by the voltage acquisition part.

According to this, the control device can rotate the first motor by controlling the four switch elements of the first and second half-bridge circuits. Likewise, the control device can rotate the second motor by controlling the four switch elements of the second and third half-bridge circuits. Accordingly, when the first and second motors are rotated, the second half-bridge circuit is shared. Therefore, the circuit configuration can be simplified in comparison with a case in which one full-bridge circuit (that is, two half-bridge circuits) is used for each motor.

Further, the control device controls each of the switch elements of the second half-bridge circuit, which is shared, by using pulse-width modulation. Accordingly, the driving of the first and second motors can be controlled with high accuracy by the change of a duty ratio of each of the switch elements of the second half-bridge circuit to be shared. Furthermore, the control device changes a duty ratio according to the voltage that is acquired by the voltage acquisition part. Accordingly, the operation of the motor can be prevented from varying depending on the magnitude of the voltage of the battery. For example, when the acquired voltage is lower than a predetermined value, a duty ratio can be increased to ensure a voltage that is used to operate each motor. For example, when the acquired voltage is higher than a predetermined value, a duty ratio can be reduced to prevent each motor from operating at a speed higher than set speed. Accordingly, each motor can be stably operated by the control of a duty ratio.

EMBODIMENTS FOR EXPLOITATION OF THE INVENTION

Figure 1:
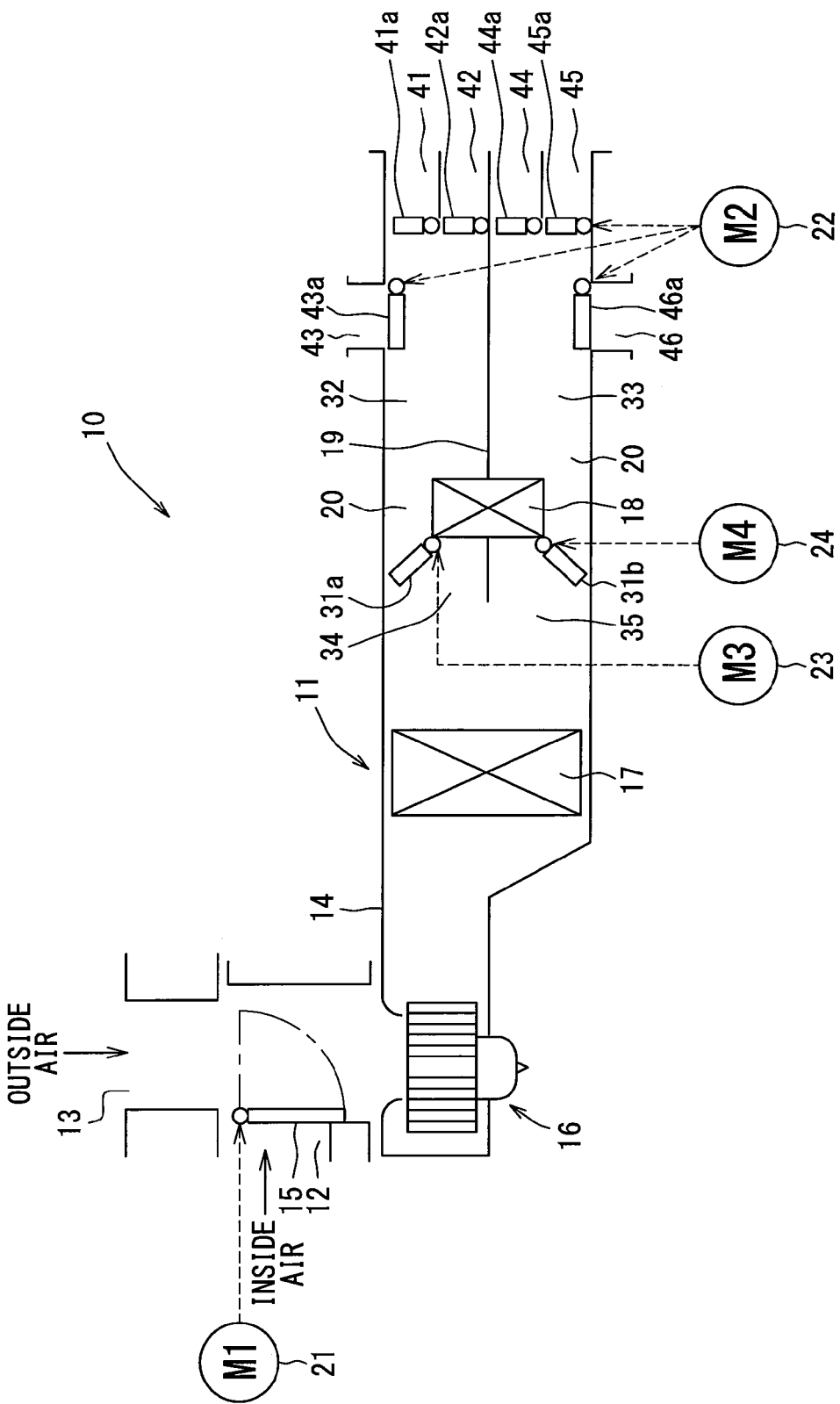
FIG. 1 is a schematic diagram showing a vehicle air conditioning apparatus according to an embodiment of this disclosure.

An embodiment of this disclosure will be described with reference to FIGS. 1 to 8. As shown in FIG. 1, a vehicle air conditioning apparatus 10 includes an indoor air conditioning unit 11. The indoor air conditioning unit 11 includes an air conditioning case 14 that includes an inside air inlet port 12 and an outside air inlet port 13. Air present in a vehicle interior (inside air) is introduced through the inside air inlet port 12. Air present outside the vehicle (outside air) is introduced through the outside air inlet port 13. An air passage through which air introduced through the respective inlet ports 12 and 13 passes and which allows the air to be sent to the vehicle interior is formed in the air conditioning case 14. The air conditioning case 14 is provided with an inside and outside air switching door 15 that selectively opens and closes the respective inlet ports 12 and 13. A first DC motor 21 is connected to the inside and outside air switching door 15 through a link mechanism (not shown). Accordingly, the first DC motor (first motor) 21 drives the inside and outside air switching door (first door) 15 that opens and closes the respective inlets (first passage) 12 and 13 through which air flows.

A centrifugal blower 16 is provided in the air conditioning case 14 on the downstream side of the respective inlet ports 12 and 13 in an air flow direction. An evaporator 17, which cools air blown from the centrifugal blower 16, is provided in the air conditioning case 14 on the downstream side of the centrifugal blower 16 in the air flow direction. The evaporator 17 forms a known refrigeration cycle together with a compressor and the like, and is a heat exchanger that cools air flowing in the air conditioning case 14. A heater core 18, which heats cold air sent from the evaporator 17, is provided on the downstream side of the evaporator 17 in the air flow direction. The heater core 18 is a heat exchanger that uses an engine coolant (hot water) as a source of heat, and heats the cold air sent from the evaporator 17.

A partition plate 19 is provided in the air conditioning case 14 on the downstream side of the evaporator 17 in the air flow direction. The partition plate 19 partitions an inner space of the air conditioning case 14 into a driver's seat side passage 34 and a passenger's seat side passage 35. Bypass passages 20 are provided on sides of the heater core 18 in the driver's seat side passage 34 and the passenger's seat side passage 35, respectively. The bypass passages 20 allow the cold air, which is sent from the evaporator 17, to bypass the heater core 18.

Air mix doors 31a and 31b are provided in the driver's seat side passage 34 and the passenger's seat side passage 35 on the upstream side of the heater core 18 in the air flow direction, respectively. The air mix doors 31a and 31b adjust a ratio of the air volume, which flows through the heater core 18, to the air volume, which flows through the bypass passages 20, of the cold air, which flows through the driver's seat side passage 34 and the passenger's seat side passage 35, by the openings thereof.

A driver's seat side mixing chamber 32 and a passenger's seat side mixing chamber 33, which mix hot air sent from the heater core 18 and cold air sent from the bypass passages 20, are provided in the driver's seat side passage 34 and the passenger's seat side passage 35 on the downstream side of the heater core 18 in the air flow direction. Since the hot air sent from the heater core 18 and the cold air sent from the bypass passages 20 are mixed, the temperature of air blown from the driver's seat side mixing chamber 32 and the passenger's seat side mixing chamber 33 toward a driver's seat and a passenger's seat provided in the vehicle interior (that is, the air temperature of air conditioning wind) is adjusted.

A third DC motor 23 is connected to the air mix door 31a of the driver's seat side passage 34 through a link mechanism (not shown). The opening of the air mix door 31a of the driver's seat side passage 34 is adjusted by the third DC motor 23. Further, a fourth DC motor 24 is connected to the air mix door 31b of the passenger's seat side passage 35 through a link mechanism (not shown). The opening of the air mix door 31b of the passenger's seat side passage 35 is adjusted by the fourth DC motor 24.

A driver's seat side face outlet 41, a driver's seat side foot outlet 42, and a driver's seat side defroster outlet 43 are provided in the driver's seat side passage 34 of the air conditioning case 14 on the downstream side of the heater core 18 in the air flow direction. Air sent from the driver's seat side mixing chamber 32 is blown toward the upper half of a driver's body through the driver's seat side face outlet 41. Air is blown toward the lower half of the driver's body from the driver's seat side mixing chamber 32 through the driver's seat side foot outlet 42. Air is blown toward a driver's seat side area of the inner surface of a windshield from the driver's seat side mixing chamber 32 through the driver's seat side defroster outlet 43.

A driver's seat side face outlet switching door 41a, which opens and closes the driver's seat side face outlet 41, is provided in the air conditioning case 14 on the upstream side of the driver's seat side face outlet 41 in the air flow direction. A driver's seat side foot outlet switching door 42a, which opens and closes the driver's seat side foot outlet 42, is provided in the air conditioning case 14 on the upstream side of the driver's seat side foot outlet 42 in the air flow direction. A driver's seat side defroster outlet switching door 43a, which opens and closes the driver's seat side defroster outlet 43, is provided in the air conditioning case 14 on the upstream side of the driver's seat side defroster outlet 43 in the air flow direction.

Likewise, a passenger's seat side face outlet 44, a passenger's seat side foot outlet 45, and a passenger's seat side defroster outlet 46 are also provided in the air conditioning case 14 on the passenger's seat side. The air conditioning case 14 is provided with outlet switching doors 44a to 46a that open and close the passenger's seat side face outlet 44, the passenger's seat side foot outlet 45, and the passenger's seat side defroster outlet 46, respectively.

The respective outlet switching doors 41a to 46a are connected to a second DC motor 22 through link mechanisms (not shown). The respective outlet switching doors 41a to 46a are independently opened and closed by the drive of the second DC motor 22 through the link mechanisms. Accordingly, the second DC motor (second motor) 22 drives the respective outlet switching doors (second door) that open and close the respective outlets (second passage) 41 to 46 through which air flows.

Figure 2:
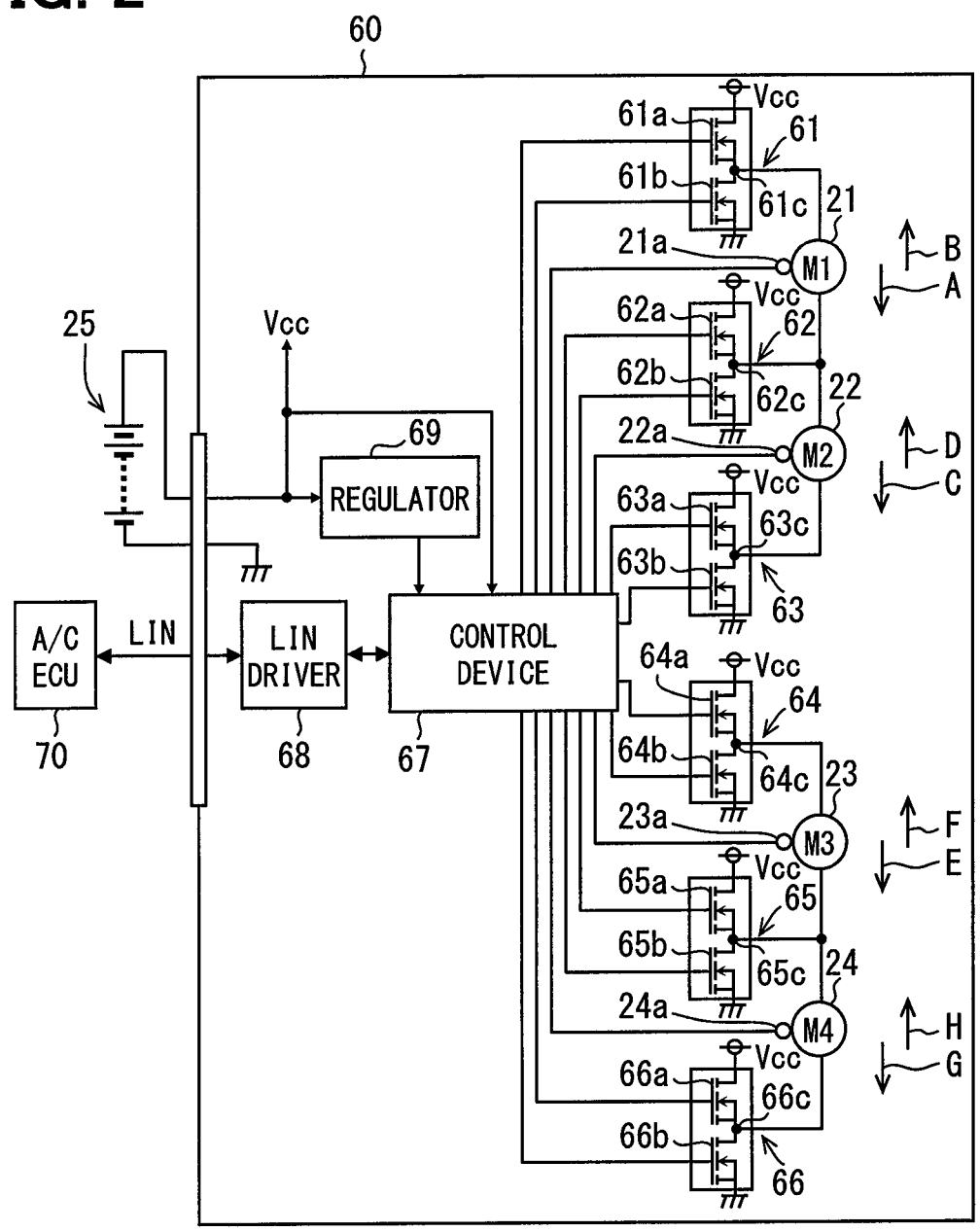
FIG. 2 is a schematic diagram showing the electrical configuration of the vehicle air conditioning apparatus according to the embodiment.

Next, the electrical configuration of the vehicle air conditioning apparatus 10 will be described. As shown in FIG. 2, the vehicle air conditioning apparatus 10 includes a motor controller 60 and an electronic controller (referred to as an A/C ECU in FIG. 2) 70. The motor controller 60 forms an air conditioning apparatus-controller, and includes the first DC motor 21, the second DC motor 22, the third DC motor 23, the fourth DC motor 24, a first half-bridge circuit 61, a second half-bridge circuit 62, a third half-bridge circuit 63, a fourth half-bridge circuit 64, a fifth half-bridge circuit 65, a sixth half-bridge circuit 66, a control device 67, an LIN driver 68, and a regulator 69. Hereinafter, the first to sixth half-bridge circuits 61 to 66 will be abbreviated as first to sixth circuits 61 to 66.

The first circuit 61 includes a high-side transistor 61a that is a positive terminal-side switch element and a low-side transistor 61b that is a negative terminal-side switch element, as a pair of switching elements. The high-side transistor 61a and the low-side transistor 61b are connected to each other in series between a positive electrode (denoted by Vcc in FIG. 2) of a battery 25 and a negative electrode (denoted by a sign of the ground in FIG. 1) of the battery 25. In this embodiment, a field effect transistor is used as each of the high-side transistor 61a and the low-side transistor 61b. Similar to the first circuit 61, the second to sixth circuits 62 to 66 include pairs of high-side transistors 62a to 66a and low-side transistors 62b to 66b that are connected to each other in series between the positive electrode of a battery 25 and the negative electrode of the battery 25, respectively. Hereinafter, the high-side transistors 61a to 66a will be abbreviated as high transistors 61a to 66a. Further, the low-side transistors 61b to 66b will be abbreviated as low transistors 61b to 66b.

The high transistor 61a and the low transistor 61b of the first circuit 61 are connected to each other at a first common node 61c. The first common node 61c is a portion where a source terminal of the high transistor 61a and a drain terminal of the low transistor 61b are connected to each other in the first circuit 61. Likewise, the high transistors 62a to 66a and the low transistors 62b to 66b of the second to sixth circuits 62 to 66 are connected to each other at second to sixth common nodes 62c to 66c, respectively. Further, the first DC motor 21 as the first motor is connected between the first and second common nodes 61c and 62c. The first circuit 61 switches the rotational direction of the first DC motor 21 together with the second circuit 62 as described below.

The second DC motor 22 as the second motor is connected between the second common node 62c of the second circuit 62 and the third common node 63c of the third circuit 63. The second circuit 62 switches the rotational direction of the second DC motor 22 together with the third circuit 63 as described below.

The fourth to sixth circuits 64 to 66 are formed so as to have the same configuration as the first to third circuits 61 to 63, and switch the rotational directions of the third and fourth DC motors 23 and 24 instead of the first and second DC motors 21 and 22.

The control device 67 controls the first to sixth circuits 61 to 66 on the basis of control signals output from the electronic controller 70, and outputs the output signals of potentiometers 21a to 24a, which correspond to the respective motors 21 to 24, to the electronic controller 70 through the LIN driver 68.

The first potentiometer 21a is a sensor that detects the rotation angle of a rotating shaft of the first DC motor 21. The second to fourth potentiometers 22a to 24a are sensors that detect the rotation angles of rotating shafts of the corresponding motors 21 to 24, respectively. The second potentiometer 22a corresponds to the second DC motor 22, the third potentiometer 23a corresponds to the third DC motor 23, and the fourth potentiometer 24a corresponds to the fourth DC motor 24.

The LIN driver 68 communicates with the electronic controller 70 through an in-vehicle LAN, and forms an interface circuit between the electronic controller 70 and the control device 67. LIN (Local Interconnect Network) is used as the communication protocol of the in-vehicle LAN of this embodiment. The regulator 69 outputs a constant power supply voltage (for example, 5 V) to the control device 67 and the like on the basis of a voltage between the positive and negative electrodes of the battery 25 in order to supply power to the control device 67 and the like.

The electronic controller 70 is a known controller that includes a memory, a microcomputer, and the like. The electronic controller 70 performs control processing for controlling the first to fourth DC motors 21 to 24 on the basis of an output signal of a switch, the output signals of plural sensors (not illustrated), and the output signals of the first to fourth potentiometers 21a to 24a. The plural sensors include, for example, an outside air temperature sensor that detects the temperature of air outside the vehicle interior, a solar radiation sensor that detects solar radiation intensity in the vehicle interior, and a temperature sensor that detects the temperature of an engine coolant.

Further, the vehicle air conditioning apparatus 10 includes switches (not shown) that operate the respective portions. The switch is, for example, a switch that is used to set an automatic air-conditioning mode in which the temperature of air blown into the vehicle interior is automatically controlled. Furthermore, the switch is, for example, a switch that is used to set a blowing mode and an independent temperature control mode. The independent temperature control mode is a mode in which the temperature of air blown from the driver's seat side outlets 41 to 43 and the temperature of air blown from the passenger's seat side outlets 44 to 46 are independently controlled.

Next, the operations of the first to sixth circuits 61 to 66 will be described. The first to sixth circuits 61 to 66 are controlled by the control device 67. The control, when the control device 67 switches a mode to an outside air mode from an inside air mode, will be described first. The inside air mode is a mode in which the outside air inlet port 13 is closed by the inside and outside air switching door 15 and the inside air inlet port 12 is opened so that air present in the vehicle interior is introduced. The outside air mode is a mode in which the inside air inlet port 12 is closed by the inside and outside air switching door 15 and the outside air inlet port 13 is opened so that air present outside the vehicle interior is introduced.

In this case, the control device 67 turns on the high transistor 61a of the first circuit 61, turns off the low transistor 61b, turns off the high transistor 62a of the second circuit 62, turns on the low transistor 62b, and turns off the high transistor 63a and the low transistor 63b of the third circuit 63. Accordingly, current flows to the low transistor 62b of the second circuit 62 from the high transistor 61a of the first circuit 61 through the first DC motor 21 as shown by an arrow A of FIG. 2 between the positive and negative electrodes of the battery 25. At this time, the rotating shaft of the first DC motor 21 rotates in one direction while the second DC motor 22 stops. The torque of the rotating shaft is transmitted to the inside and outside air switching door 15 through the link mechanism and the inside and outside air switching door 15 rotates, so that a mode is switched to the outside air mode from the inside air mode.

Next, the control, when the control device 67 switches a mode to the inside air mode from the outside air mode, will be described. In this case, the control device 67 turns on the high transistor 62a of the second circuit 62, turns off the low transistor 62b, turns off the high transistor 61a of the first circuit 61, turns on the low transistor 61b, and turns off the high transistor 63a and the low transistor 63b of the third circuit 63.

Accordingly, current flows to the low transistor 61b of the first circuit 61 from the high transistor 62a of the second circuit 62 through the first DC motor 21 as shown by an arrow B of FIG. 2 between the positive and negative electrodes of the battery 25. At this time, the rotational direction of the rotating shaft of the first DC motor 21 is reversed and the rotating shaft rotates in the other direction. The torque of the rotating shaft is transmitted to the inside and outside air switching door 15 through the link mechanism and the inside and outside air switching door 15 rotates, so that a mode is switched to the inside air mode from the outside air mode.

Next, control at the time of switching of an outlet mode will be described. An outlet mode is switched by the control of the second DC motor 22. When the rotating shaft of the second DC motor 22 rotates in one direction, an outlet mode is switched to a face mode, a bi-level mode, a foot mode, a foot/defroster mode, and a defroster mode in this order by the second DC motor 22 and the link mechanism. Further, when the rotating shaft of the second DC motor 22 rotates in the other direction, an outlet mode is switched to a defroster mode, a foot/defroster mode, a foot mode, a bi-level mode, and a face mode in this order.

Meanwhile, the face mode is a mode in which the face outlets 41 and 44 are opened, the foot outlets 42 and 45 are closed, and the defroster outlets 43 and 46 are closed. The bi-level mode is a mode in which the face outlets 41 and 44 are opened, the foot outlets 42 and 45 are opened, and the defroster outlets 43 and 46 are closed. The foot mode is a mode in which the face outlets 41 and 44 are closed, the foot outlets 42 and 45 are opened, and the defroster outlets 43 and 46 are slightly opened. The foot/defroster mode is a mode in which the face outlets 41 and 44 are closed, the foot outlets 42 and 45 are opened, and the defroster outlets 43 and 46 are opened. The defroster mode is a mode in which the face outlets 41 and 44 are closed, the foot outlets 42 and 45 are closed, and the defroster outlets 43 and 46 are opened.

The control device 67 turns off the high transistor 61a and the low transistor 61b of the first circuit 61, turns on the high transistor 63a of the third circuit 63, turns off the low transistor 63b, turns off the high transistor 62a of the second circuit 62, and turns on the low transistor 62b. Accordingly, current flows to the low transistor 62b of the second circuit 62 from the high transistor 63a of the third circuit 63 through the second DC motor 22 as shown by an arrow D of FIG. 2 between the positive and negative electrodes of the battery 25. At this time, the rotating shaft of the second DC motor 22 rotates in one direction while the first DC motor 21 stops. The torque of the rotating shaft is transmitted to the outlet switching doors 41a to 46a through the link mechanisms. Accordingly, the outlet switching doors 41a to 46a operate and an outlet mode is switched in normal order, so that one of the face mode, the bi-level mode, the foot mode, the foot/defroster mode, and the defroster mode is performed.

Likewise, the control device 67 turns off the high transistor 61a and the low transistor 61b of the first circuit 61, turns on the high transistor 62a of the second circuit 62, turns off the low transistor 62b, turns off the high transistor 63a of the third circuit 63, and turns on the low transistor 63b. Accordingly, current supplied from the high transistor 62a of the second circuit 62 flows to the low transistor 63b of the third circuit 63 through the second DC motor 22 as shown by an arrow C of FIG. 2 between the positive and negative electrodes of the battery 25. At this time, the rotational direction of the rotating shaft of the second DC motor 22 is reversed and the rotating shaft rotates in the other direction. Accordingly, the outlet switching doors 41a to 46a operate and an outlet mode is switched in reverse order.

Next, control in which the control device 67 switches a mode to the outside air mode from the inside air mode and switches an outlet mode will be described. In this case, the control device 67 turns on the high transistor 61a of the first circuit 61, turns off the low transistor 61b, turns off the high transistor 62a of the second circuit 62, turns on the low transistor 62b, turns on the high transistor 63a of the third circuit 63, and turns off the low transistor 63b.

Accordingly, current supplied from the high transistor 61a of the first circuit 61 flows to the low transistor 62b of the second circuit 62 through the first DC motor 21 as shown by an arrow A of FIG. 2 between the positive and negative electrodes of the battery 25. For this reason, the first DC motor 21 drives the inside and outside air switching door 15 through the link mechanism and a mode is shifted to the outside air mode. In addition, current supplied from the high transistor 63a of the third circuit 63 flows to the low transistor 62b of the second circuit 62 through the second DC motor 22 as shown by an arrow D of FIG. 2 between the positive and negative electrodes of the battery 25. For this reason, the second DC motor 22 drives the outlet switching doors 41a to 46a through the link mechanisms as described above and a mode is shifted to the blowing mode in normal order.

Next, control in which the control device 67 switches a mode to the inside air mode from the outside air mode and switches an outlet mode will be described. In this case, the control device 67 turns off the high transistor 61a of the first circuit 61, turns on the low transistor 61b, turns on the high transistor 62a of the second circuit 62, turns off the low transistor 62b, turns off the high transistor 63a of the third circuit 63, and turns on the low transistor 63b.

Accordingly, current flows to the low transistor 61b of the first circuit 61 from the high transistor 62a of the second circuit 62 through the first DC motor 21 as shown by an arrow B of FIG. 2 between the positive and negative electrodes of the battery 25. For this reason, the first DC motor 21 drives the inside and outside air switching door 15 through the link mechanism and a mode is shifted to the inside air mode. In addition, current flows to the low transistor 63b of the third circuit 63 from the high transistor 62a of the second circuit 62 through the second DC motor 22 as shown by an arrow C of FIG. 2 between the positive and negative electrodes of the battery 25. For this reason, the second DC motor 22 drives the outlet switching doors 41a to 46a through the link mechanisms and a mode is shifted to the blowing mode in reverse order.

Next, the control of the air mix doors 31a and 31b will be described. The operations of the air mix doors 31a and 31b include the operations of the air mix doors 31a and 31b to the maximum hot position from the maximum cooling position and the operations of the air mix doors 31a and 31b to the maximum cooling position from the maximum hot position in reverse. The maximum cooling position corresponds to the positions of the air mix doors 31a and 31b when the air mix doors 31a and 31b fully close air intakes of the heater core 18 and fully open the bypass passages 20. The maximum hot position corresponds to the positions of the air mix doors 31a and 31b when the air mix doors 31a and 31b fully open the air intakes of the heater core 18 and fully close the bypass passages 20.

The fourth circuit 64, the fifth circuit 65 and the sixth circuit 66 are formed so as to have the same configuration as the first circuit 61, the second circuit 62 and the third circuit 63 as described above, and drive the third DC motor 23 and fourth DC motor 24 instead of the first DC motor 21 and the second DC motor 22 so that the first circuit 61, the second circuit 62 and the third circuit 63 are driven.

The control of the third DC motor 23 will be described first. The third DC motor 23 is controlled to control the air mix door 31a of the driver's seat side passage 34. The control device 67 controls the fourth to sixth circuits 64 to 66 so as to allow current to flow to the third DC motor 23 as shown by an arrow E of FIG. 2 between the positive and negative electrodes of the battery 25 as described above. In this case, the rotating shaft of the third DC motor 23 rotates in one direction while the fourth DC motor 24 stops. The torque of the rotating shaft is transmitted to the air mix door 31a through the link mechanism. Further, the air mix door 31a of the driver's seat side passage 34 is shifted to the maximum hot position from the maximum cooling position.

Furthermore, the control device 67 controls the fourth to sixth circuits 64 to 66 so as to allow current to flow to the third DC motor 23 as shown by an arrow F of FIG. 2 between the positive and negative electrodes of the battery 25. In this case, the rotating shaft of the third DC motor 23 rotates in the other direction while the fourth DC motor 24 stops. Accordingly, the air mix door 31a of the driver's seat side passage 34 is shifted to the maximum cooling position from the maximum hot position.

Next, the control of the fourth DC motor 24 will be described. The fourth DC motor 24 is controlled to control the air mix door 31b of the passenger's seat side passage 35. The control device 67 controls the fourth to sixth circuits 64 to 66 so as to allow current to flow to the fourth DC motor 24 in a direction H of FIG. 2 between the positive and negative electrodes of the battery 25. In this case, the rotating shaft of the fourth DC motor 24 rotates in one direction while the third DC motor 23 stops. For this reason, the air mix door 31b of the passenger's seat side passage 35 is shifted to the maximum hot position from the maximum cooling position.

Further, the control device 67 controls the fourth to sixth circuits 64 to 66 so as to allow current to flow to the fourth DC motor 24 as shown by an arrow G of FIG. 2 between the positive and negative electrodes of the battery 25. In this case, the rotating shaft of the fourth DC motor 24 rotates in the other direction while the third DC motor 23 stops. Accordingly, the air mix door 31b of the passenger's seat side passage 35 is shifted to the maximum cooling position from the maximum hot position.

Next, a case in which the control device 67 simultaneously controls the respective air mix doors 31a and 31b will be described. The control device 67 controls the fourth to sixth circuits 64 to 66 so as to allow current to flow to the third DC motor 23 in a direction A and so as to allow current to flow to the fourth DC motor 24 in a direction D between the positive and negative electrodes of the battery 25. Accordingly, the third and fourth DC motors 23 and 24 simultaneously rotate in one direction and simultaneously rotate the respective air mix doors 31a and 31b. For this reason, the respective air mix doors 31a and 31b are simultaneously shifted to the maximum hot position from the maximum cooling position.

Further, the control device 67 controls the fourth to sixth circuits 64 to 66 so as to allow current to flow to the third DC motor 23 in a direction B and so as to allow current to flow to the fourth DC motor 24 in a direction C between the positive and negative electrodes of the battery 25. Accordingly, the third and fourth DC motors 23 and 24 simultaneously rotate the respective air mix doors 31a and 31b in the other direction. For this reason, the respective air mix doors 31a and 31b are simultaneously shifted to the maximum cooling position from the maximum hot position.

Next, the control processing of the electronic controller 70 of this embodiment will be described. First, when the automatic air-conditioning mode is set by the switch, the electronic controller 70 performs automatic air-conditioning control processing that allows the air temperature of air blown into the vehicle interior from the respective outlets 41 to 46 to approach a target temperature. When the automatic air-conditioning control processing is performed, the electronic controller 70 outputs control signals, which are used to control the first to fourth DC motors 21 to 24, to the control device 67 through the LIN driver 68.

Accordingly, the control device 67 controls the first to third circuits 61 to 63. Therefore, the first DC motor 21 drives the inside and outside air switching door 15 and the second DC motor 22 drives the outlet switching doors 41a to 46a. For this reason, any one of the inside air mode and the outside air mode is performed by the inside and outside air switching door 15. Further, any one outlet mode is performed by the outlet switching doors 41a to 46a.

Furthermore, when the defroster mode is set by the switch, the control device 67 simultaneously drives the first and second DC motors 21 and 22 in one direction by controlling the first to third circuits 61 to 63. Accordingly, the outside air mode is performed by the inside and outside air switching door 15, and the defroster mode is performed by the outlet switching doors 41a to 46a.

After that, when the automatic air-conditioning mode is set by the switch, the defroster mode is canceled and the control device 67 drives the first and second DC motors 21 and 22 by controlling the first to third circuits 61 to 63. For this reason, the inside air mode is performed by the inside and outside air switching door 15, and any one of the face mode, the bi-level mode, the foot mode, and the foot/defroster mode is performed by the outlet switching doors 41a to 46a.

Here, when the independent temperature control mode is not set by the switch, the fourth to sixth circuits 64 to 66 are controlled to rotate the third and fourth DC motors 23 and 24. For this reason, the third and fourth DC motors 23 and 24 rotate the respective air mix doors 31a and 31b through the link mechanisms so that the air mix doors 31a and 31b interlock with each other.

After that, when the independent temperature control mode is set by the switch, the fourth to sixth circuits 64 to 66 are controlled to rotate the third and fourth DC motors 23 and 24. For this reason, the third DC motor 23 rotates the air mix door 31a of the driver's seat side passage 34 through the link mechanism and the fourth DC motor 24 rotates the air mix door 31b of the passenger's seat side passage 35 through the link mechanism.

Next, more specific control of the control device 67 will be described with reference to FIGS. 3 to 8. The control device 67 controls the high transistors 62a and 65a and the low transistors 62b and 65b of the second and fifth circuits 62 and 65 by using pulse-width modulation (PWM). Since the second and fifth circuits 62 and 65 are circuits that are shared, the control device 67 can perform the PWM drive of the first to fourth DC motors 21 to 24 by performing the PWM drive of the second and fifth circuits 62 and 65. Further, each of the DC motors 21 to 24 has a lowest operating voltage, and an operation cannot be ensured when a voltage to be supplied is equal to or lower than the lowest operating voltage. In other words, there is a concern that each of the DC motors 21 to 24 may stop when a voltage to be supplied is equal to or lower than the lowest operating voltage.

Accordingly, the control device 67 acquires the voltage of the battery 25 as shown in FIG. 1. That is, a part of the control device 67, which acquires the voltage of the battery 25, may be used as a voltage acquisition part. The control device 67 determines a duty ratio, which is used to control the second and fifth circuits 62 and 65, according to a battery voltage. Hereinafter, since the control of the first to third circuits 61 to 63 is the same as the control of the fourth to sixth circuits 64 to 66, the control of the first to third circuits 61 to 63 will be mainly described.

When stopping the inside and outside air switching door 15 or each of the outlet switching doors 41a to 46a at a predetermined stop position, the control device 67 controls the circuits so that a duty ratio decreases as the inside and outside air switching door 15 or each of the outlet switching doors 41a to 46a approaches the stop position. The predetermined stop position of the inside and outside air switching door 15 is, for example, a position where the inside air inlet port 12 is closed and a position where the outside air inlet port 13 is closed. Further, predetermined stop positions of the outlet switching doors 41a to 46a are positions corresponding to the respective blowing modes. When each door is disposed at such a position, the positioning accuracy of the door at the stop position can be improved by the deceleration of the door as the door approaches the stop position. Furthermore, when the stop position of each door is a position where the door comes into contact with the air conditioning case 14, noise such as impulsive sound caused by contact at the time of stop of each door can be reduced.

Figure 3:
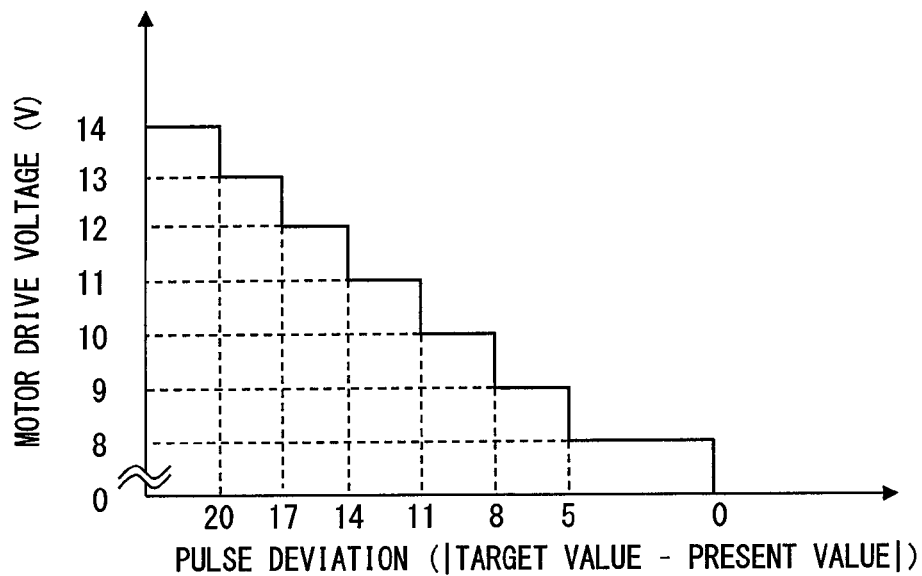
FIG. 3 is a diagram showing a relationship between a pulse deviation and a motor drive voltage in the embodiment.

A duty ratio is determined by a voltage command map shown in FIG. 3. In the voltage command map, a motor drive voltage is reduced stepwise to decelerate the door as a deviation decreases. Further, in the voltage command map, a motor drive voltage is maintained so as not to be lower than the lowest operating voltage (8 V in FIG. 3) when a deviation becomes equal to or less than a predetermined lower limit (5 in FIG. 3). A duty ratio is determined on the basis of the motor drive voltage that is determined by the voltage command map shown in FIG. 3.

Figure 4:
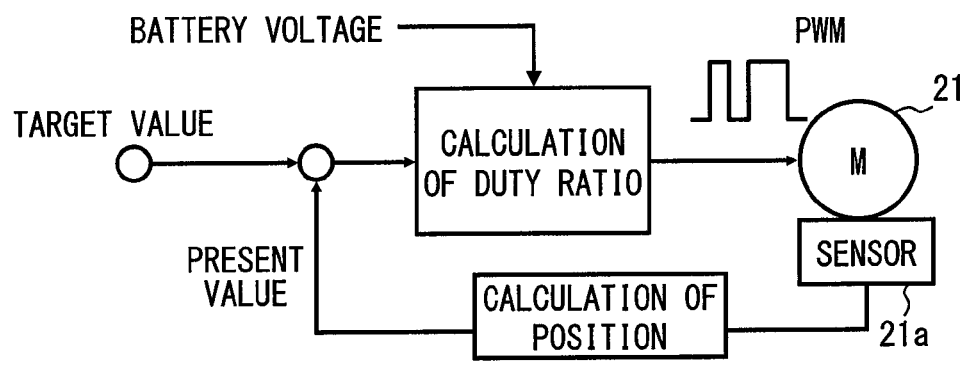
FIG. 4 is a schematic diagram illustrating a calculation method of a control device of the embodiment.

As shown in FIG. 4, the control device 67 determines a duty ratio for PWM by using the voltage command map shown in FIG. 3 while using a deviation between a target value and the present value and a battery voltage as input values. Further, the determined duty ratio is used to control the respective DC motors 21 to 24. Furthermore, the present value is calculated from the output signal of each of the potentiometers 21a to 24a corresponding to each of the DC motors 21 to 24, and is fed back.

Figure 5:
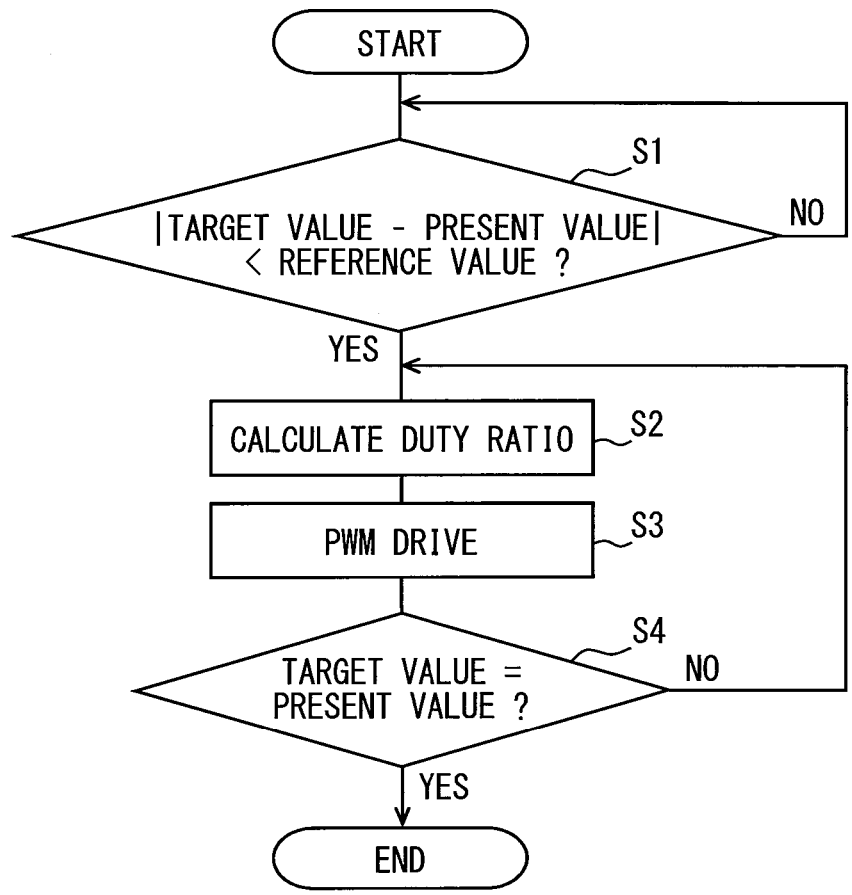
FIG. 5 is a flowchart illustrating the motor control processing of the control device of the embodiment.

Next, the processing of the control device 67 will be described with reference to FIG. 5. Processing illustrated in FIG. 5 is performed while power is applied to the control device 67. In Step S1, it is determined whether or not the absolute value of a difference (deviation) between the target value and the present value is smaller than a deceleration-start reference value. If the absolute value of a difference between the target value and the present value is smaller than the deceleration-start reference value, this flow proceeds to Step S2. The processing of Step S1 is repeated until the absolute value of a difference between the target value and the present value becomes smaller than the deceleration-start reference value.

Since the deviation is smaller than the deceleration-start reference value in Step S2, a duty ratio used for PWM drive is calculated and this flow proceeds to Step S3. A voltage command map, which is stored in a memory of the control device 67 in advance, is used in the calculation of the duty ratio. The duty ratio is determined so that the motor drive voltage decreases as the deviation decreases. Further, in the voltage command map, the motor drive voltage is maintained so as not to be lower than the lowest operating voltage (8 V in FIG. 3) when the deviation becomes equal to or less than a predetermined lower limit (5 in FIG. 3).

Since the duty ratio is determined, PWM drive is performed in Step S3 using the determined duty ratio and this flow proceeds to Step S4.

In Step S4, it is determined whether or not the target value and the present value correspond to each other. If the target value and the present value correspond to each other, this flow ends. If the target value and the present value do not correspond to each other, this flow returns to Step S2. Accordingly, the processing of Step S2 and the processing of Step S3 are repeated until the target value and the present value correspond to each other.

When the deviation is smaller than the deceleration-start reference value, the control device 67 performs PWM drive as described above so that the present value gradually approaches the target value. Further, since the duty ratio is determined so that a motor drive voltage is not lower than the lowest operating voltage of the first DC motor 21, the improvement of stopping accuracy and the prevention of noise can be achieved while the unstable operation of the first DC motor 21 is prevented.

Figure 6:
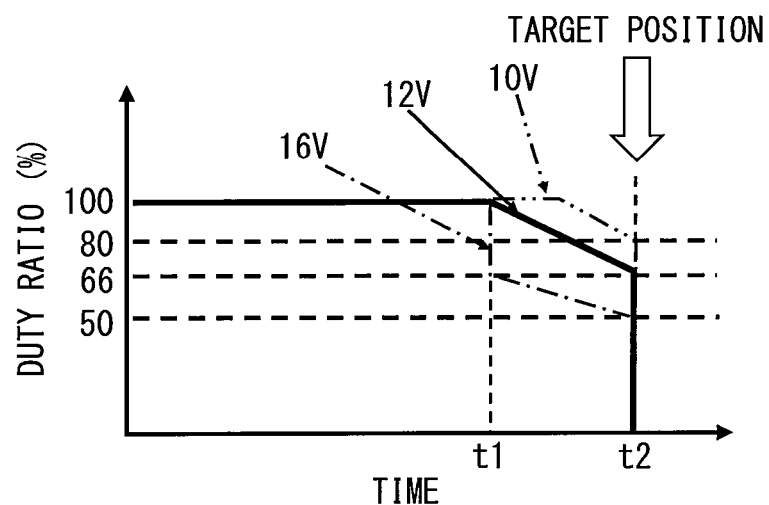
FIG. 6 is a diagram showing the operation of a first DC motor of the embodiment.

Next, the behavior of, for example, the first DC motor 21 will be described with reference to FIG. 6. In FIG. 6, the lowest operating voltage is, for example, 8 V. PWM drive is performed from time t1 when the deviation of the first DC motor 21 becomes smaller than the deceleration-start reference value (see FIG. 6). Then, a duty ratio is gradually reduced at a motor drive voltage not lower than the lowest operating voltage, and the deviation reaches the target value at time t2. The high transistor 61a and the low transistor 61b of the first circuit 61 are turned off at the time t2, so that the first DC motor 21 stops.

The change of a duty ratio, which is caused when the motor stops, varies depending on a battery voltage. When a battery voltage is high, a duty ratio significantly changes at the time of stop of the motor. When a battery voltage is low, a duty ratio slightly changes at the time of stop of the motor. Since the lowest operating voltage is, for example, 8 V, the lowest value of a duty ratio is 50% when a battery voltage is 16 V as shown by a one-dot chain line of FIG. 6 (that is, 8V/16V=50%). When a battery voltage is 10 V as shown by a two-dot chain line of FIG. 6, the lowest value of a duty ratio is 80% (that is, 8V/10V=80%). When a battery voltage is 12 V as shown by a thick solid line of FIG. 6, the lowest value of a duty ratio is 66% (that is, 8V/12V=66%).

Figure 7:
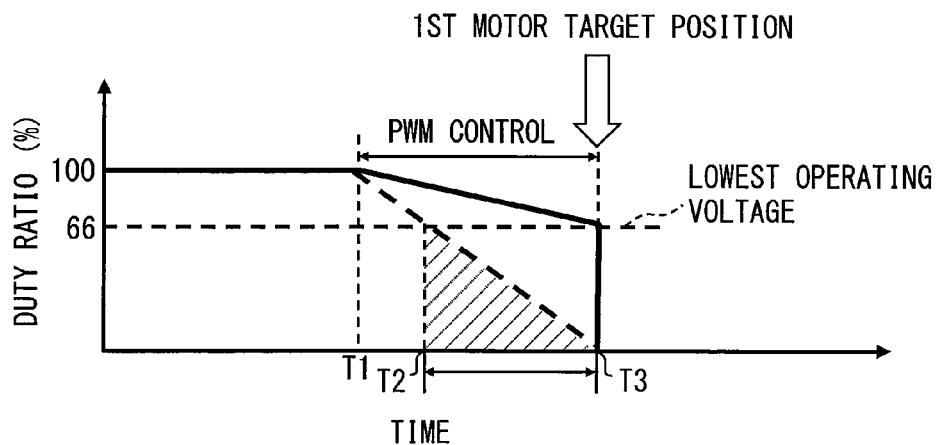
FIG. 7 is a diagram showing the operation of the first DC motor of the embodiment.
Figure 8:
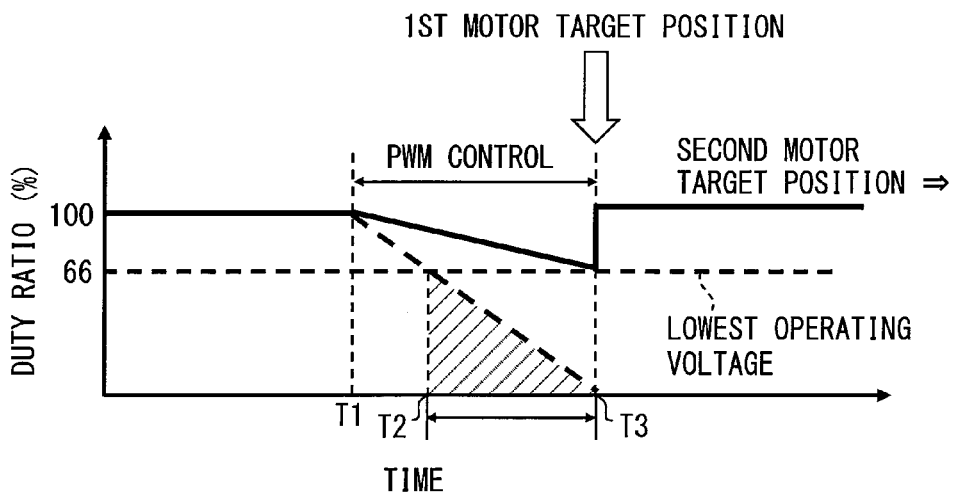
FIG. 8 is a diagram showing the operation of a second DC motor of the embodiment.

Next, the behaviors of the respective motors, when the first and second DC motors 21 and 22 are simultaneously operated, will be described with reference to FIGS. 7 and 8. Since a battery voltage is set to 12 V in FIGS. 7 and 8, a duty ratio of 66% corresponds to the lowest operating voltage as described above. As shown in FIGS. 7 and 8, the target position of the first DC motor 21 is closer than the target position of the second DC motor 22. That is, the second DC motor reaches the target position much later than the time range shown in FIG. 8. Accordingly, the two motors 21 and 22 are simultaneously driven first so that the first DC motor 21 reaches the target position, and the first DC motor 21 is stopped after the first DC motor 21 reaches the target position. After that, only the second DC motor 22 is driven and is controlled so that the second DC motor 22 reaches the target position.

In this case, PWM drive is performed from time T1 when the deviation of the first DC motor 21 becomes smaller than the deceleration-start reference value (see FIG. 7). Since the second circuit 62 is subjected to PWM drive, the second DC motor 22 is also subjected to PWM drive and decelerates. Further, a duty ratio is gradually reduced at a motor drive voltage not lower than the lowest operating voltage, and reaches the target value at time T3. Then, the high transistor 61*a* and the low transistor 61*b* of the first circuit 61 are turned off at the time T3, so that the first DC motor 21 stops. After that, since the target position and the present position of the second DC motor 22 deviate from each other, the second circuit 62 is driven so that a duty ratio becomes 100%.

When the motor is controlled to merely decelerate regardless of the lowest operating voltage, a motor drive voltage is lower than the lowest operating voltage at time T2 as shown in FIGS. 7 and 8 by a broken line. For this reason, the operation of the motor is unstable in a time range shown by oblique lines. However, since a duty ratio is controlled so that a motor drive voltage is not lower than the lowest operating voltages of the first and second DC motors 21 and 22 as described above, the control device 67 of this embodiment can prevent the operations of the two motors 21 and 22 from being unstable.

When the control device 67 of the motor controller 60 of this embodiment simultaneously rotates the first and second DC motors 21 and 22 through the first circuit 61, the second circuit 62 and the third circuit 63 as described above, the control of the first DC motor 21 and the control of the second DC motor 22 share the second circuit 62. Further, when the control device 67 simultaneously rotates the third and fourth DC motors 23 and 24 through the fourth circuit 64, the fifth circuit 65 and the sixth circuit 66, the control of the third DC motor 23 and the control of the fourth DC motor 24 share the fifth circuit 65. For this reason, six half-bridge circuits are used to rotate the four motors.

When two half-bridge circuits (that is, one full-bridge circuit) are used for each electric motor, eight half-bridge circuits are needed to rotate four electric motors. For this reason, in this embodiment, the number of half-bridge circuits to be used is reduced in comparison with a case in which two half-bridge circuits are used for each electric motor. Accordingly, the circuit configuration of the motor controller 60 can be simplified. For this reason, the cost of the motor controller 60 can be reduced.

Further, the control device 67 controls the respective switch elements 62*a* and 62*b* of the second circuit 62, which is to be shared, by using pulse-width modulation. Accordingly, the drive of the first and second DC motors 21 and 22 can be controlled with high accuracy by the change of the duty ratio of each of the switch elements 62*a* and 62*b* of the second circuit 62 to be shared. Furthermore, the control device 67 changes a duty ratio according to an acquired voltage. Accordingly, the operation of the motor can be prevented from varying depending on the magnitude of the voltage of the battery 25. For example, when the acquired voltage is lower than a predetermined value, a duty ratio can be increased to ensure a voltage that is used to operate each motor. For example, when the acquired voltage is higher than a predetermined value, a duty ratio can be reduced to prevent each motor from operating at a speed higher than set speed. Accordingly, each motor can be stably operated by the control of a duty ratio.

Further, in this embodiment, the control device 67 sets the lowest value of a duty ratio, which is obtained during the drive of at least one of the first and second DC motors 21 and 22, to a value that is not lower than the lowest duty ratio where each of the DC motors 21 and 22 operates. Since a duty ratio is determined on the basis of a voltage command made in consideration of a battery voltage as described above, a motor drive voltage is not lower than the lowest operating voltage of each of the motors 21 and 22 and the motors 21 and 22 can be prevented from stopping before a target value. Furthermore, the other motor 21 or 22 can also be driven without stopping or excessively decelerating.

Moreover, in this embodiment, the control device 67 controls the circuits so that a duty ratio decreases as the inside and outside air switching door 15 or each of the outlet switching doors 41*a* to 46*a* approaches the stop position, when stopping the inside and outside air switching door 15 or each of the outlet switching doors 41*a* to 46*a* at a predetermined stop position. Accordingly, as each door approaches the stop position, each door can decelerate. Therefore, the positioning accuracy of each door at the stop position can be improved. Furthermore, when the stop position of each door is a position where the door comes into contact with the air conditioning case 14, noise such as impulsive sound caused by contact at the time of stop of each door can be reduced.

As described above, the control device 67 of this embodiment performs PWM control by using a battery voltage in control so that a duty ratio is not lower than the duty ratio corresponding to the lowest operating voltage. Accordingly, an effect obtained from deceleration and an effect of stabilizing an operation can be achieved.

The preferred embodiment of this disclosure has been described above, but this disclosure is not limited to the above-mentioned embodiment at all and can be modified without departing from the gist of this disclosure.

The structures of the embodiment are merely illustrative, and the scope of this disclosure is not limited to the range of the description of the structures.

A battery voltage value has been directly acquired from the battery 25 in the above-mentioned embodiment, but this disclosure is not limited to the configuration in which a battery voltage value is directly acquired from the battery 25. For example, the control device 67 may acquire a battery voltage value from the electronic controller 70 through LIN communication. Further, the control device 67 may calculate a motor drive speed from a sensor signal and may calculate a battery voltage value on the basis of the motor drive speed.

One voltage command map has been used in the above-mentioned embodiment, but the number of voltage command maps is not limited to one. For example, a battery voltage is monitored by the electronic controller 70 and a voltage command map may be appropriately changed according to the battery voltage.

An example in which the air mix doors 31*a* and 31*b* are used as the first and second doors and an example in which the inside and outside air switching door 15 and the outlet switching doors 41*a* to 46*a* are used as the first and second doors have been disclosed in the above-mentioned embodiment, but this disclosure is not limited thereto. In a vehicle air conditioning apparatus 10 using two air mix doors other than the air mix door 31*a* of the driver's seat side passage 34 and the air mix door 31*b* of the passenger's seat side-passage 35, two air mix doors may be used as the first and second doors.

Specifically, this disclosure may be applied to a vehicle air conditioning apparatus 10 adapted so that an upper air mix door is provided above the heater core 18 and a lower air mix door is disposed below the heater core 18 in the air conditioning case 14 and the respective air mix doors can be independently driven. In this case, for example, the upper air mix door is used as the first door and the lower air mix door is used as the second door. The upper air mix door is used in, for example, air-conditioning for front seats in a vehicle interior and the lower air mix door is used in, for example, air-conditioning for rear seats in a vehicle interior.

Further, this disclosure may be applied to a vehicle air conditioning apparatus 10 that includes a first motor driving driver's seat side outlet switching doors 41*a* to 43*a* and a second motor driving passenger's seat side outlet switching doors 44*a* to 46*a* in a vehicle interior. In this case, for example, the driver's seat side outlet switching doors 41*a* to 43*a* are used as a first door and the passenger's seat side outlet switching doors 44*a* to 46*a* are used as a second door.

Furthermore, this disclosure may be applied to an indoor air conditioning unit 11 that includes a first motor driving a front seat outlet switching door used in air-conditioning for front seats in a vehicle interior and a second motor driving a rear seat outlet switching door used in air-conditioning for rear seats in the vehicle interior. In this case, the front seat outlet switching door is used as a first door and the rear seat outlet switching door is used as a second door.

Further, the above-mentioned embodiment has disclosed an example in which an inside/outside air mode is shifted to the outside air mode from the inside air mode and an outlet mode is sequentially switched to the defroster mode from the face mode when the rotating shafts of the first and second DC motors 21 and 22 simultaneously rotate in one direction. However, this disclosure is not limited thereto, and an inside/outside air mode may be shifted to the inside air mode from the outside air mode and an outlet mode may be sequentially switched to the defroster mode from the face mode when the rotating shafts of the first and second DC motors 21 and 22 simultaneously rotate in one direction.

An example in which the vehicle air conditioning apparatus 10 is used as an air conditioning apparatus has been disclosed in the above-mentioned embodiment. However, the air conditioning apparatus is not limited to the vehicle air conditioning apparatus, and an installation-air conditioner, such as a home-air conditioner and an office-air conditioner, may be used. Further, the vehicle air conditioning apparatus is not limited to an air conditioning apparatus and may be a motor controller that controls the drive of at least two motors.

What is claimed is:

1. A motor controller that controls driving of first and second motors, the motor controller comprising:
    a first half-bridge circuit that includes a pair of switch elements connected to each other in series between a positive terminal and a negative terminal of a battery;
    a second half-bridge circuit that includes a pair of switch elements connected to each other in series between the positive terminal and negative terminal of the battery;
    a third half-bridge circuit that includes a pair of switch elements connected to each other in series between the positive terminal and the negative terminal of the battery;
    a voltage acquisition part that acquires a voltage of the battery; and
    a control device that controls the pair of switch elements of each of the half-bridge circuits and controls the pair of switch elements of at least the second half-bridge circuit by using pulse-width modulation, wherein
    the first motor is connected to the first half-bridge circuit and second half-bridge circuit,
    the second motor is connected to the second half-bridge circuit and third half-bridge circuit,
    the control device applies an electric current to the first motor between the first half-bridge circuit and second half-bridge circuit by controlling the pair of switch elements of the first half-bridge circuit and the pair of switch elements of the second half-bridge circuit,
    the control device applies an electric current to the second motor between the second half-bridge circuit and third half-bridge circuit by controlling the pair of switch elements of the second half-bridge circuit and the pair of switch elements of the third half-bridge circuit,
    the control device changes a duty ratio of the control, which uses the pulse-width modulation, according to the voltage that is acquired by the voltage acquisition part,
    the control device sets a lowest value of the duty ratio, during the driving of at least one of the first motor and second motor, to a value that is not lower than a duty ratio corresponding to a lowest operating voltage at which the first motor and second motor are driven, and
    when the control device controls a present value of either one of the first and second motors to become equal to a target value, when an absolute value of a difference between the present value and the target value becomes less than a deceleration-start reference value, the control device sets the duty ratio lower than 100% and not lower than the lowest value of the duty ratio, and when the present value becomes equal to the target value, the control device stops the control of the motor.

2. The motor controller according to claim 1, wherein when the control device controls both the first motor and the second motor to reach their target values, and when one of the motors reaches the target value, the control device stops the one of the motors which has reached the target value, and the control device drives another motor, which has not reached the target value, at the duty ratio of 100%.

3. The motor controller according to claim 2, wherein the first motor drives a first door that opens and closes a first passage through which air flows,
    the second motor drives a second door that opens and closes a second passage through which air flows, and when the first door or the second door is stopped at a predetermined stop position, the control device sets the duty ratio so that the duty ratio decreases with decrease in distance between the first door or the second door and the stop position.

* * * * *